March 1, 1932.  H. P. HOLLNAGEL  1,847,875
ELECTRIC CONDENSER
Filed June 11, 1926
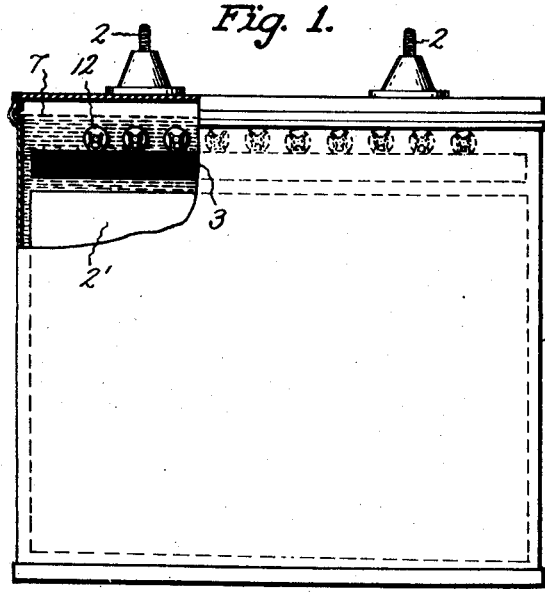
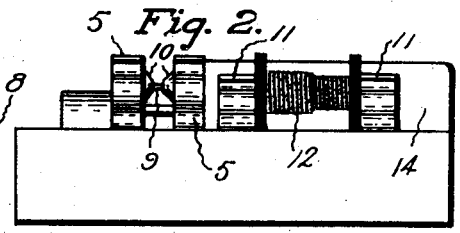
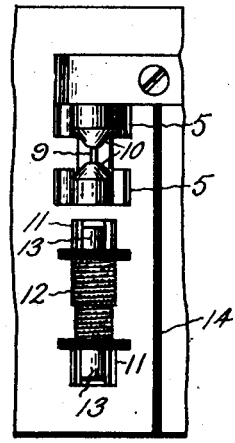
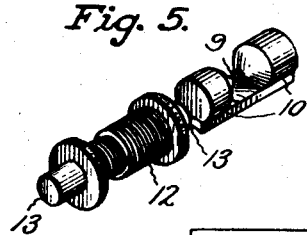
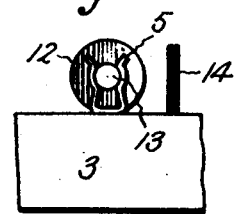
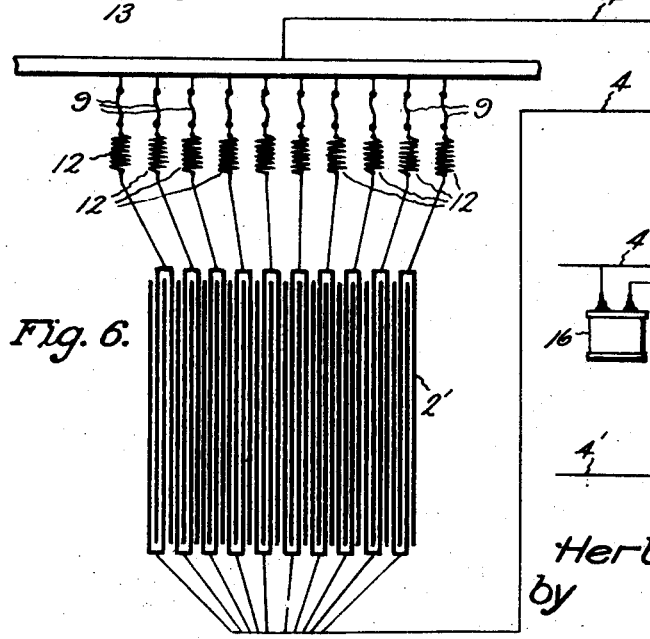
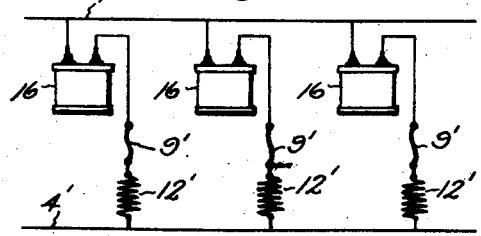
Inventor,
Herbert P. Hollnagel,
by
Attorney.

Patented Mar. 1, 1932

1,847,875

UNITED STATES PATENT OFFICE

HERBERT P. HOLLNAGEL, OF SWAMPSCOTT, MASSACHUSETTS, ASSIGNOR TO GENERAL ELECTRIC COMPANY, A CORPORATION OF NEW YORK

ELECTRIC CONDENSER

Application filed June 11, 1926. Serial No. 115,365.

My invention relates to electric condensers and among the objects of my invention are, for example, to divide the condenser into sections and to provide protective means with each of these sections. It will be understood that the condenser may of course consist of metallic plates separated by dielectric material and it is one of the objects of my invention to offer protection to the condenser as a unit, or to each plate individually by means of a combination of non-inductive resistances and fuses. Other objects will be brought out in the course of the following description.

In systems of electrical distribution, it is often desirable to bring up the power factor by the introduction of electrical capacity. One form of this kind of capacity is the electrical condenser. While it is the usual practice to introduce these at various positions along the transmission line where higher power factor is required, yet capacity may be distributed in such a manner as to bring up the power factor fairly uniformly throughout the line. Condensers have in the past been variously constructed to obtain and maintain this result, that is, by the alternate disposition of metal foils and dielectric sheets such as 0.5 mil paper, the entire mass, for example, being immersed in a fluid dielectric of the character of an oil like transil oil.

In this type of construction, condensers have been known to give trouble and have broken down on higher voltages; this has probably been due to transient phenomena that occur on the line which on entering the condenser caused breakdown to occur at different points of the dielectric, these phenomena growing until the leakage current becomes of an order to cause ultimate disruptions accompanied by local short circuit conditions. Another cause is probably due to the presence of conducting particles in the paper which cause slight leakage currents, which cause local heating of the paper and as this grows in value, ultimately raises the temperature to a point where the paper actually becomes charred, at which time short circuit conditions are established. In any case, my invention acts to conserve the condenser, for I provide a sectionalized construction such that a number of sections are connected in multiple all within the same condenser unit. The purpose of this construction is to protect the condenser from the possible sources of difficulty referred to in the preceding and in case they should arise, make it possible to eliminate the particular section or sections in which they have arisen.

I provide means for opening the circuit by means of a fuse which is of such dimensions and constitution as to cause it to fuse at a low temperature. This temperature will furthermore be determined by the resistance of the fuse, that is, the carrying capacity of the fuse. The rate at which this fuse will open depends upon its heat capacity and that of the immediate surroundings. The rate at which the arc if formed will be extinguished, depends likewise upon the heat capacity, heat conductivity, and pressure, as well as the general physical and chemical characteristics of the immediate surroundings, such as hydrogen or some inert gas, transil oil or the like.

Furthermore, I place a non-inductive resistance in series with this fuse, which resistance may be of iron, or any resistant material whatever, preferably one of high permeability and resistivity, as these are the factors, as well as the diameter, which immediately effect the increase of resistance offered to transient frequencies of higher order. It is well known that resistance damps oscillations at a high rate. I, therefore, introduce non-inductive resistance to avoid affecting the power factor. The aggregate result of these resistances is such as to have little influence in the actual current of the circuit under operating conditions, but to limit the current by at least partially absorbing the energy contained in such frequencies as may arise in transient phenomena, that is, to effectually damp out such frequencies.

My invention will be more clearly understood from the following specification and claims, reference being had to the accompanying drawings in which Fig. 1 is a view of the condenser of my invention in elevation, and partly in section; Fig. 2 is a side elevation of the fuse and resistor block; Figs. 3, 4 and 5 are details of the device; Fig. 6 is a schematic representation of the device in which 10 sections are shown in parallel, each section having a fuse and a non-inductive resistor in series; and Fig. 7 is a representation of one of a number of varied arrangements wherein a number of condensers, associated with a circuit and supplied with resistors and fuses of similar nature is used.

Referring more in detail to the drawings, in Fig. 1 it will be seen that the condenser is provided with a pair of terminals 2. In this figure, the side 2' of one of the 10 sections of the condenser indicated in Fig. 6 may be seen. On top of the condenser, there is provided a block 3 of insulating material upon which are mounted the fuse and resistance clips 5 and 11. It will be seen that the whole condenser unit is incased within the receptacle 6, in which it may be immersed or submerged in a suitable dielectric material 7, such as oil, paraffin, wax, or the like. This receptacle preferably is hermetically sealed, as indicated by the seal 8. By referring to Figs. 2, 3 and 4, it will be seen that the fuse 9 is supported between the clips 5, each of which terminates in a massive terminal 10, see Fig. 5. The non-inductive resistor 12, on the other hand, is mounted between clips 11, the resistor being provided with metallic terminals 13, which are engaged by the clips 11. In order to prevent a possible "strike-over" or flash, I provide a shield 14 between adjacent sets of fuses and resistors.

Referring to Fig. 6, there is diagrammatically represented in this figure a condenser consisting of 10 sections connected across a circuit, the conductors 4 of which circuit are indicated. Interposed between the condenser elements and the line, I provide 10 sets of fuses 9, and 10 corresponding sets of non-inductive resistors 12.

In Fig. 7, I have represented diagrammatically three sets of condensers 16, located across the conductors 4', 4' of the line. Associated with each condenser is a set of fuses 9' and non-inductive resistors 12'.

The operation of the sectionalized condenser of my invention above described is as follows: Inasmuch as these condensers may be considered as part of a system for supplying electric light or power, it will be assumed that the system is subject to surges or transients such as arise, for example, due to the operation of switches and other devices which ordinarily are responsible for such phenomena. As these condensers are part of the system, the transients will of necessity enter the condensers unless some means is provided by which the energy is damped out, absorbed or dissipated. The resistor units which are directly in series with the fuses accomplish this result for any given section and give up the heat generated to the immediate surroundings which in turn must communicate it to the walls of the condenser whence it is radiated. In the event that a portion of one of the condensers as represented by any one section becomes weakened as a consequence of leakage introduced, for example, by conducting particles in the paper or impurities in the oil, the section may ultimately become short circuited but serious damage is prevented except to the one section because of the provision of the fuses and of the non-inductive resistors.

By building the condenser in sections, moreover, it becomes possible to eliminate that particular section that has become damaged as a result of the short circuit. This automatically occurs when the fuse is blown, or if it is found that a section is damaged and a fuse has not blown the fuse may be broken.

When fuse 9 opens, should an arc result, there is the additional protection in the form of the resistor 12' and fuse 9' in the circuit, which limits the allowable current through this section.

It is to be understood that a low fusible alloy of the kind ordinarily used in fuses can carry a current of a very much greater magnitude than that for which it was designed for a few increments of time satisfactorily, but would not be able to carry a current of this magnitude for any appreciable time without fusing and opening the circuit. Therefore, just as soon as a steady state of current leakage through the dielectric or a definite continued state of transients has been arrived at, currents of a magnitude which may exceed the capacity for which the fuse was designed under normal operating conditions will flow causing the fuse to melt; or a transient whose energy is of such a magnitude as to exceed the heat capacity of the fuse will also cause the fuse to open the circuit by its fusion. However, the fuse will continue to operate as a continuous conductor for transient phenomena of low energy content, the resisting portion of the combination being that which functions to absorb the transient energy.

This combination functions in another manner besides that heretofore referred to. Reference has been made only to transients which arise outside the condenser per se, but in the period that one section of the condenser is actually disintegrating or breaking down, there are oscillations of a transient character set up within the condenser (depending upon the electrical constants of lead, etc.) and these in turn will surge back and forth through the several condenser sections which constitute the entire unit. These will, therefore, do damage unless a means is placed in their path by means of which the energy of the oscillations is materially damped out or absorbed. Therefore, the resistor in each of these sections serves to absorb the energy in this case and to dissipate it as heat. The fuse functions to open the circuit only at such times as the flow of current through it causes the conditions to arise which have been pointed out above.

I have indicated that a fuse probably has an impulse time. By this it should be understood that there is a minimum time for a given amount of energy in which a fuse will operate. Moreover, it should be understood that the time required for a fuse to blow under load conditions depends upon the terminals to which the fuse is connected; first, because of their heat capacity; second, because of their heat conductivity; third, because of their shape and proximity to the fuse. I have also indicated that should an arc persist on opening of the fuse, its duration will depend upon these conditions and the ionization of the dielectric. The surrounding medium whether liquid or gaseous is very important, as it is by its immediate convection, conduction and radiation, as well as its heat, that the heat evolved by the electric current in passing through the fuse resistance may be dissipated. If a gas is used, a material like hydrogen, that has a high specific heat, is desirable. It should also be as inert as possible. If a liquid is used such as transil oil, there is little to be said with regard to either its specific heat or its heat conductivity, other than that they should be of the best, compatible with the other physical characteristics. If the dielectric could be put under pressure it would help to extinguish the arc if formed.

A fuse operates probably in accordance with the following physical facts. It has a heat capacity which is fixed by its mass, specific heat, and a melting point which has a perfectly definite physical magnitude for the material of which it is composed. It also has a radiation coefficient which is not only dependent upon the character of the material, but also upon its temperature and that of the immediate surroundings. It is also connected to terminals which have corresponding characteristics.

A fuse must also have a certain energy characteristic which determines its melting point. This energy characteristic will be dependent upon the physical makeup of the material and the factors which have been mentioned hertofore. If the energy is supplied at a low rate, the opportunity for radiation, convection and conduction away from the fuse itself will be greater than if the energy is supplied at the very high rate. More energy will also be taken up by the heat capacity of the fuse and as the result of greater conduction the immediate surroundings will absorb more energy.

While I have illustrated in connection with the drawings certain embodiments of my invention, it will be understood that, in view of the disclosure, the invention may be varied in form without departing from the spirit thereof or from the scope of the claims contained herein.

What I claim as new and desire to secure by Letters Patent of the United States is:

1. An electric condenser divided into a plurality of sections, and a lead for each section with a fuse and a resistor element in series with each lead, each lead with its fuse and resistor forming a separate branch, and all of said branches being connected in multiple to a common terminal.

2. In combination, a plurality of condensers each in a branch circuit in series with a fuse and with a resistor element, said branch circuits being connected in multiple, the resistor in each branch circuit serving to protect the corresponding branch against surges resulting from the breakdown of a condenser in any of the other branches.

3. In combination, a pair of terminals, a plurality of branches connected in multiple to said terminals, there being located in each branch a condenser element, a resistance element in series with one of said condenser elements and a fuse element in series with another of said condenser elements, said fuse adapted to disconnect its corresponding branch from the multiple connection when it blows and the resistance in the other branch adapted to protect the condenser element of its corresponding branch from disturbances arising due to the blowing of the fuse.

4. An electric condenser divided into a plurality of sections connected in multiple, said condenser adapted to be connected with a source of current, a lead for each section, a fuse and a resistance element in series with one of said leads and with the condenser section in said lead and a resistance in another one of said leads in series with the condenser section of said other lead, said fuse operating when it blows to disconnect the condenser section and its lead from the multiple connection, the resistance element in the same lead operating to terminate the current flow after the fuse is blown and the resistance in the other branch operating to protect the condenser section and its corresponding branch during the flow of current after the said fuse is blown.

In witness whereof I have hereunto set my hand this 7th day of June, 1926.

HERBERT P. HOLLNAGEL.